(12) United States Patent
Shimada

(10) Patent No.: US 7,693,169 B2
(45) Date of Patent: Apr. 6, 2010

(54) TRANSMISSION APPARATUS AND FRAME TRANSMISSION METHOD

(75) Inventor: Katsumi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 983 days.

(21) Appl. No.: 11/321,698

(22) Filed: Dec. 29, 2005

(65) Prior Publication Data
US 2007/0058602 A1 Mar. 15, 2007

(30) Foreign Application Priority Data
Sep. 15, 2005 (JP) .............................. 2005-268971

(51) Int. Cl.
H04L 12/54 (2006.01)
H04J 3/16 (2006.01)
H04L 12/28 (2006.01)

(52) U.S. Cl. .................. 370/428; 370/472; 370/412

(58) Field of Classification Search ............. 370/395.1, 370/409, 420, 419, 340, 341, 395.2, 389, 370/428, 429, 390, 471, 474; 709/238, 249, 709/250, 252, 253, 244
See application file for complete search history.

(56) References Cited

U.S. PATENT DOCUMENTS

| | | | |
|---|---|---|---|
| 6,275,492 B1 * | 8/2001 | Zhang | 370/392 |
| 6,553,029 B1 * | 4/2003 | Alexander | 370/389 |
| 6,807,172 B1 * | 10/2004 | Levenson et al. | 370/389 |
| 6,829,651 B1 * | 12/2004 | Bass et al. | 709/238 |
| 7,299,296 B1 * | 11/2007 | Lo et al. | 709/238 |
| 7,308,505 B2 * | 12/2007 | Herring et al. | 709/238 |
| 7,359,389 B2 * | 4/2008 | Kusayanagi | 370/401 |

FOREIGN PATENT DOCUMENTS

JP 2001-177549 6/2001

OTHER PUBLICATIONS

"Part 3: Carrier sense multiple access with collision detection (CSMA/CD) access method and physical layer specifications" <URL: http://standards.ieee.org/getieee802/download/802.3-2002.pdf>.

* cited by examiner

*Primary Examiner*—Hanh Nguyen
(74) *Attorney, Agent, or Firm*—Fujitsu Patent Center

(57) ABSTRACT

A line unit holds in its active table data a number that indicates which flooding setting table is to be made active. An input frame forwarding unit embeds the number in an internal frame header of a frame that is to be output. As the number is embedded before the frame is forwarded to each line unit via a backboard, the output destination for the same frame is determined by a common active flooding setting table. Thus, frame destruction or duplication is prevented.

4 Claims, 19 Drawing Sheets

FIG.6
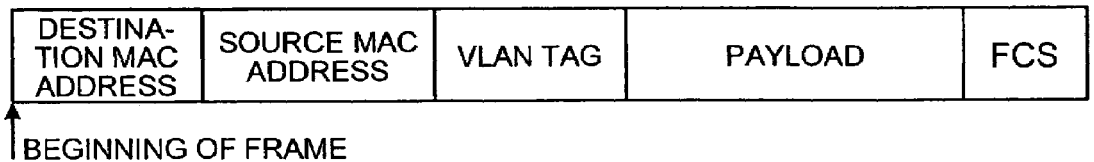
↑ BEGINNING OF FRAME
FIG.7
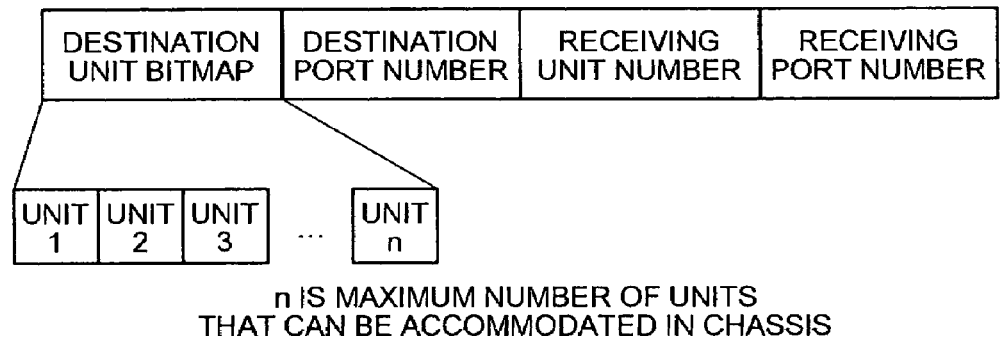
n IS MAXIMUM NUMBER OF UNITS
THAT CAN BE ACCOMMODATED IN CHASSIS
FIG.8
| PORT 1 | 0 |
| --- | --- |
| PORT 2 | 0 |
| PORT 3 | 10 |
| PORT 4 | 20 |
0 INDICATES THAT PORT DOES NOT BELONG TO TRUNK,
VALUE OTHER THAN 0 INDICATES TRUNK NUMBER

FIG.9

| TRUNK NUMBER | NUMBER OF PORTS | LIST OF PORTS (ARRANGED IN ASCENDING ORDER) |
|---|---|---|
| ⋮ | ⋮ | ⋮ |
| 10 | 2 | 0103,0203 |
| ⋮ | ⋮ | ⋮ |
| 20 | 2 | 0104,0204 |
| ⋮ | ⋮ | ⋮ |

FIG.10

| | |
|---|---|
| PORT 1 | 1 |
| PORT 2 | 1 |
| PORT 3 | 1 |
| PORT 4 | 1 |

1 INDICATES THAT FRAME IS OUTPUT AND
0 INDICATES THAT FRAME IS NOT OUTPUT

FIG.11

| | |
|---|---|
| PORT 1 | 1 |
| PORT 2 | 1 |
| PORT 3 | 0 |
| PORT 4 | 0 |

1 INDICATES THAT FRAME IS OUTPUT AND
0 INDICATES THAT FRAME IS NOT OUTPUT

FIG.12

| MAC ADDRESS | UNIT NUMBER | PORT NUMBER |
|---|---|---|
| ⋮ | ⋮ | ⋮ |

FIG.15
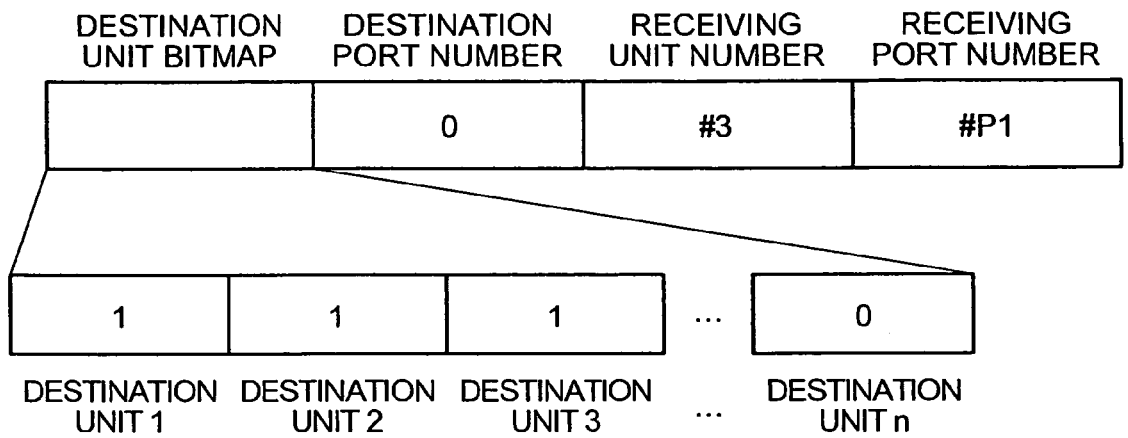
FIG.16
| MAC ADDRESS | UNIT NUMBER | PORT NUMBER |
|---|---|---|
| ⋮ | ⋮ | ⋮ |
| 0A | #3 | #P1 |
| ⋮ | ⋮ | ⋮ |
FIG.17
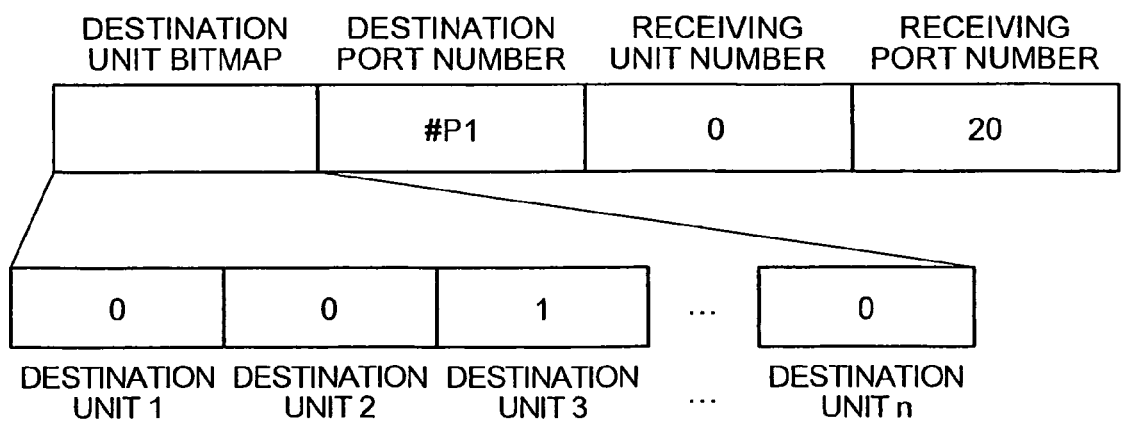

| MAC ADDRESS | UNIT NUMBER | PORT NUMBER |
|---|---|---|
| ⋮ | ⋮ | ⋮ |
| 0A | #3 | #P1 |
| 0B | 0 | 20 |
| ⋮ | ⋮ | ⋮ |

FIG.21

| TRUNK NUMBER | NUMBER OF PORTS | LIST OF PORTS (ARRANGED IN ASCENDING ORDER) |
|---|---|---|
| ⋮ | ⋮ | ⋮ |
| 10 | 1 | 0203 |
| ⋮ | ⋮ | ⋮ |
| 20 | 1 | 0204 |
| ⋮ | ⋮ | ⋮ |

FIG.22

| | |
|---|---|
| PORT 1 | 1 |
| PORT 2 | 1 |
| PORT 3 | 0 |
| PORT 4 | 0 |

1 INDICATES THAT FRAME IS OUTPUT AND
0 INDICATES THAT FRAME IS NOT OUTPUT

FIG.23

| | |
|---|---|
| PORT 1 | 1 |
| PORT 2 | 1 |
| PORT 3 | 1 |
| PORT 4 | 1 |

1 INDICATES THAT FRAME IS OUTPUT AND
0 INDICATES THAT FRAME IS NOT OUTPUT

FIG.25 n IS MAXIMUM NUMBER OF UNITS
THAT CAN BE ACCOMMODATED IN CHASSIS

| DESTINATION UNIT BITMAP | DESTINATION PORT NUMBER | RECEIVING UNIT NUMBER | RECEIVING PORT NUMBER | ACTIVE FLOODING SETTING TABLE |
|---|---|---|---|---|

| UNIT 1 | UNIT 2 | UNIT 3 | ... | UNIT n |
|---|---|---|---|---|

FIG.28

| DESTINATION UNIT BITMAP | DESTINATION PORT NUMBER | RECEIVING UNIT NUMBER | RECEIVING PORT NUMBER | ACTIVE FLOODING SETTING TABLE |
|---|---|---|---|---|
|  | 0 | #3 | #P1 | 2 |

| 1 | 1 | 1 | ... | 0 |
|---|---|---|---|---|
| DESTINATION UNIT 1 | DESTINATION UNIT 2 | DESTINATION UNIT 3 | ... | DESTINATION UNIT n |

FIG.30

| PORT 1 | 1 | 1 |
| PORT 2 | 1 | 1 |
| PORT 3 | 1 | 0 |
| PORT 4 | 1 | 0 |

2151  2152

1 INDICATES THAT FRAME IS OUTPUT AND 0 INDICATES THAT FRAME IS NOT OUTPUT

FIG.31

| PORT 1 | 1 | 1 |
| PORT 2 | 1 | 1 |
| PORT 3 | 0 | 1 |
| PORT 4 | 0 | 1 |

2151  2152

1 INDICATES THAT FRAME IS OUTPUT AND 0 INDICATES THAT FRAME IS NOT OUTPUT

TRANSMISSION APPARATUS AND FRAME TRANSMISSION METHOD

BACKGROUND OF THE INVENTION

1. Field of the Invention

The present invention relates to a technology for transmitting frames (packets). More particularly, the present invention relates to a technology that allows change in link aggregation structure without interruption to the service or loss or duplication of the frames.

2. Description of the Related Art

Ethernet (Registered trademark) has been extensively employed in Local Area Networks (LAN). However, because networks can be establishment at relatively low cost by employing the Ethernet, the Ethernet is now a days adopted in Wide Area Networks as well. For example, Ethernet is now employed as the backbone of a communication carrier.

With that perspective, there is a great demand for increasing communication speed and availability of the Ethernet. Link aggregation, stipulated by Institute of Electrical and Electronics Engineers (IEEE) 802.3ad (presently integrated with IEEE 802.3), is one such attempt for enhancing the communication speed and the availability of the Ethernet.

The link aggregation involves combining a plurality of physical data channels into a single logical link. For example, by employing the link aggregation, five 1-Gbps data channels can be combined to form one 5-Gbps link. When data channels are combined in this manner, it becomes possible to increases the bandwidth and the availability of data channel, in addition, even if a fault occurs in one of the links, communication can be continued over other normally operating links. A conventional technology has been disclosed in Part 3: Carrier sense multiple access with collision detection (CSMA/CD) access method and physical layer specifications, [online], March 2002, retrieved from the internet [URL: http://standards.ieee.org/getieee802/download/802.3-2002.pdf].

However, care needs to be taken when employing the link aggregation. That is, it is necessary to make sure that frame duplication does not occur when flooding all the links with Media Access Control (MAC) frame while broadcasting or multicasting. Frame duplication otherwise occurs in the destination device of the link aggregation. Frame duplication can be prevented by outputting frames only to one link among the links that are combined to form a link aggregate.

Conventional transmission apparatuses, such as layer 2 switches (hereinafter, "L2 switch"), use a table containing information pertaining to which ports to deliver frames to during flooding, thus, taking care that frame duplication does not occur.

However, frame duplication and/or frame loss can occur while the table is being updated. Frame duplication and/or frame loss is a serious problem when it comes to communication carriers.

SUMMARY OF THE INVENTION

It is an object of the present invention to at least solve the problems in the conventional technology.

According to an aspect of the present invention, a transmission apparatus that forwards data frames includes a storage unit that stores setting data pertaining to frame transmission in a plurality of forms; a selecting unit that extracts identification data embedded in a data frame to be forwarded and selects setting data form among the setting data stored in the storage unit based on the identification data; and a communication control unit that forwards the data frame according to the desired setting data.

According to another aspect of the present invention, a transmission apparatus that forwards data frames includes at least one receiving communications unit configured to receive the data frame and at least one forwarding communications unit configured to forward the data frame, the receiving communications unit and the forwarding communications unit being connected to each other. The receiving communications unit includes an embedding unit that embeds in a received data frame identification data indicative of information required for selecting setting data; and a communication control unit that forwards identification data embedded data frame to the forwarding communications unit. The forwarding communications unit includes a storage unit that stores setting data pertaining to frame transmission in a plurality of forms; a selecting unit that extracts the identification data embedded in the identification data embedded data frame and selects setting data form among the setting data stored in the storage unit based on the identification data; and a communication control unit that forwards the data frame according to the desired setting data.

According to still another aspect of the present invention, a transmission method for forwarding data frames includes storing in a storing unit setting data pertaining to frame transmission in a plurality of forms; extracts identification data embedded in a data frame to be forwarded; selecting setting data form among the setting data stored in the storage unit based on the identification data; and forwarding the data frame according to the desired setting data.

According to still another aspect of the present invention, a transmission method for forwarding data frames is realized on a transmission apparatus that includes at least one receiving communications unit configured to receive the data frame and at least one forwarding communications unit configured to forward the data frame, the receiving communications unit and the forwarding communications unit being connected to each other. The transmission method including the receiving communications unit performing embedding in a received data frame identification data indicative of information required for selecting setting data; and forwarding identification data embedded data frame to the forwarding communications unit. The transmission method including the forwarding communications unit performing storing in a storage unit setting data pertaining to frame transmission in a plurality of forms; extracts the identification data embedded in the identification data embedded data frame; selects setting data form among the setting data stored in the storage unit based on the identification data; and forwards the data frame according to the desired setting data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic for explaining the format of a MAC frame;

FIG. 7 is a schematic for explaining the format of an internal frame header;

FIG. 8 is a schematic for explaining the structure of a trunk number table;

FIG. 9 is a schematic for explaining the contents of a link aggregate table;

FIG. 10 is a schematic for explaining the contents of a flooding setting table of one line unit;

FIG. 11 is a schematic for explaining the contents of a flood setting table of another line unit;

FIG. 12 is a schematic for explaining the contents of a learning table;

FIG. 15 is a schematic for explaining an internal frame header of a frame forwarded to the backboard;

FIG. 16 is a schematic for explaining the contents of the learning table after learning has occurred;

FIG. 17 is a schematic for explaining the internal frame header of the frame forwarded to the backboard;

FIG. 21 is a schematic for explaining the contents of the link aggregate table after modification of the table;

FIG. 22 is a schematic for explaining the contents of the flooding setting table after modification of the table;

FIG. 23 is a schematic for explaining the contents of the flooding setting table of a line unit 1101 after modification of the table;

FIG. 25 is a schematic for explaining the format of an internal frame header according to the second embodiment;

FIG. 28 is a schematic for explaining an internal frame header of the frame forwarded to the backboard;

FIG. 30 is a schematic for explaining the contents of the flooding setting table of a line unit 2100 after modification of the table; and FIG. 31 is a schematic for explaining the contents of a flooding setting table of the line unit 2101 after modification.

DETAILED DESCRIPTION OF THE PREFERRED EMBODIMENTS

Exemplary embodiments of the present invention are explained next with reference to the accompanying drawings. In the embodiments, the frame transmission method according to the present invention is applied to a chassis type L2 switch, however, the frame transmission method can be similarly applied to a transmission apparatus other than the chassis-type L2 switch.

Figure 1:
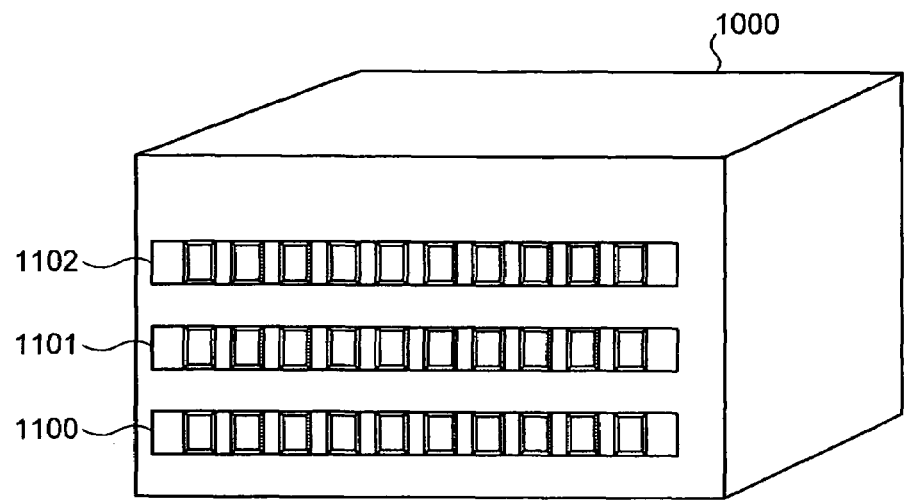
FIG. 1 is perspective of a chassis-type L2 switch.

The chassis-type L2 switch is one of the configurations of an L2 switch. In the L2 switch, a plurality of line units, which can be added or removed, are connected via a backboard. FIG. 1 is a perspective of a typical chassis-type L2 switch 1000. The chassis-type L2 switch 1000 includes three line units 1100, 1101, and 1102, connected via a backboard.

A line unit is a printed circuit board provided with a plurality of interface ports (for example, a 100 Mbps Ethernet port) and a configuration for frame transmission. The line unit is connected to the backboard with a connector.

The chassis-type structure allows the line unit combination to be changed according to the application of the device and enables the device to be used for different purposes. For example, the configuration of the device can be changed by using only 100 Mbps Ethernet units or by using some 1-Gbps Ethernet units or ATM interface units, etc. Thus, different configurations of L2 switch can be realized in the same chassis.

Further, if some of the ports or line units become faulty, only the faulty line units can be changed, thus making the device available for access at all times.

Figure 2:
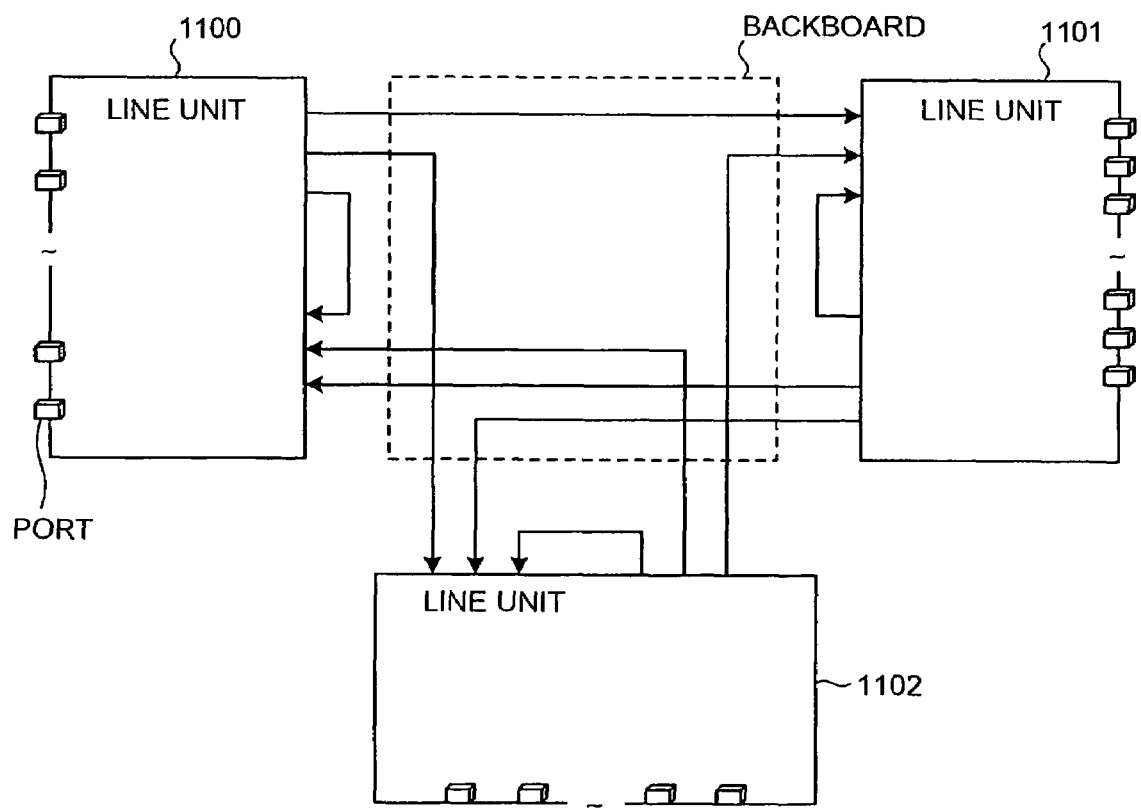
FIG. 2 is a schematic for explaining the connection of line units.

The line units of the chassis-type L2 switch may be interconnected in a mesh form via the wiring of the backboard. For example, if there are three line units, as shown in FIG. 2, each line unit forms three output routes and three input routes on the backboard.

Figure 3:
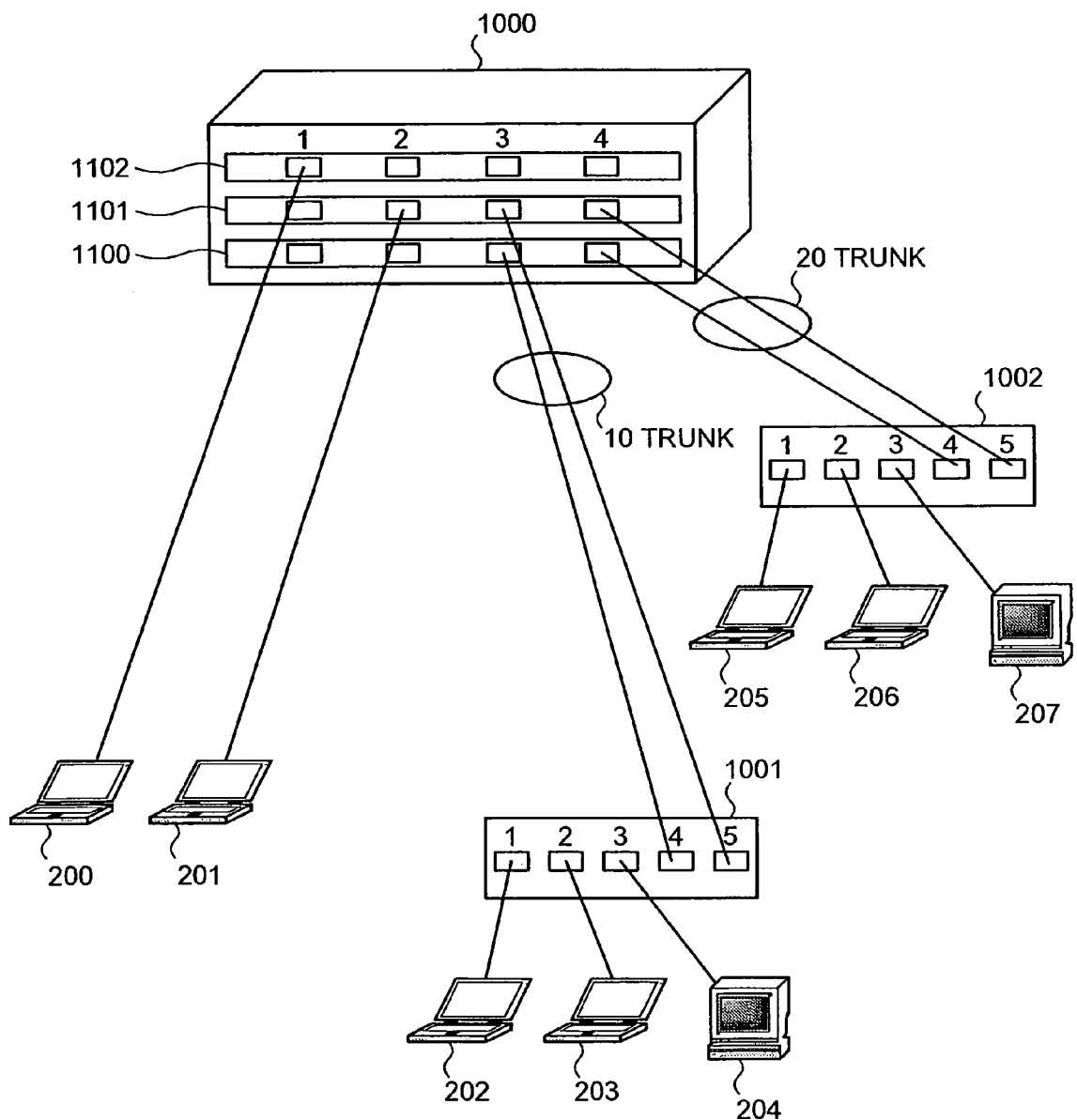
FIG. 3 is a schematic of the configuration of a network.

A network having link aggregates incorporated in it is explained next. FIG. 3 is a schematic of such a network. The network includes three L2 switches 1000 through 1002 and communications terminals 200 through 207.

The L2 switch 1000 is a chassis-type L2 switch and includes three line units 1100, 1101, and 1102. Each line unit has an Ethernet interface. The line unit 1100 is assigned a unit numbers #1, the line unit 1101 is assigned a unit number #2, and the line unit 1102 is assigned a unit number #3.

The L2 switches 1001 and 1002 are ordinary L2 switches and not chassis-type.

Each port of the L2 switch is assigned a port number to distinguish it from other ports in the line unit or the device. In the following explanation, the port number n is denoted as #Pn.

The L2 switches 1000 and 1001 are interconnected by a link aggregate formed by combining two links. Specifically, a port #P3 of the line unit 1100 of the L2 switch 1000 is connected to a port #P4 of the L2 switch 1001. Moreover, a port #P3 of the line unit 1101 of the L2 switch 1000 is connected to a port #P5 of the L2 switch 1001.

Two different line units in the L2 switch 1000 are included in the link aggregate so that even if one line unit becomes faulty, communication can be continued using the other line unit.

The L2 switches 1000 and 1002 are also interconnected by a link aggregate formed by combining two links. Specifically, a port #P4 of the line unit 1100 of the L2 switch 1000 is connected to a port #P4 of the L2 switch 1002, and a port #P4 of the line unit 1101 of the L2 switch 1000 is connected to a port #P5 of the L2 switch 1002.

A cluster of links grouped together by link aggregation is called a trunk, which is distinguished by a trunk number. In this patent specification, the link cluster between the L2 switches 1000 and 1001 is assigned trunk number 10, and the link cluster between the L2 switches 1000 and 1002 is assigned trunk number 20.

The communications terminal 200 is connected to a port #P1 of the line unit 1102, and the communications terminal 201 is connected to a port #P2 of the line unit 1101. The communications terminals 202 through 204 are respectively connected to the ports #P1 through #P3 of the L2 switch 1001.

The communications terminals 205 through 207 are respectively connected to the ports #P1 through #P3 of the L2 switch 1002.

Figure 4:
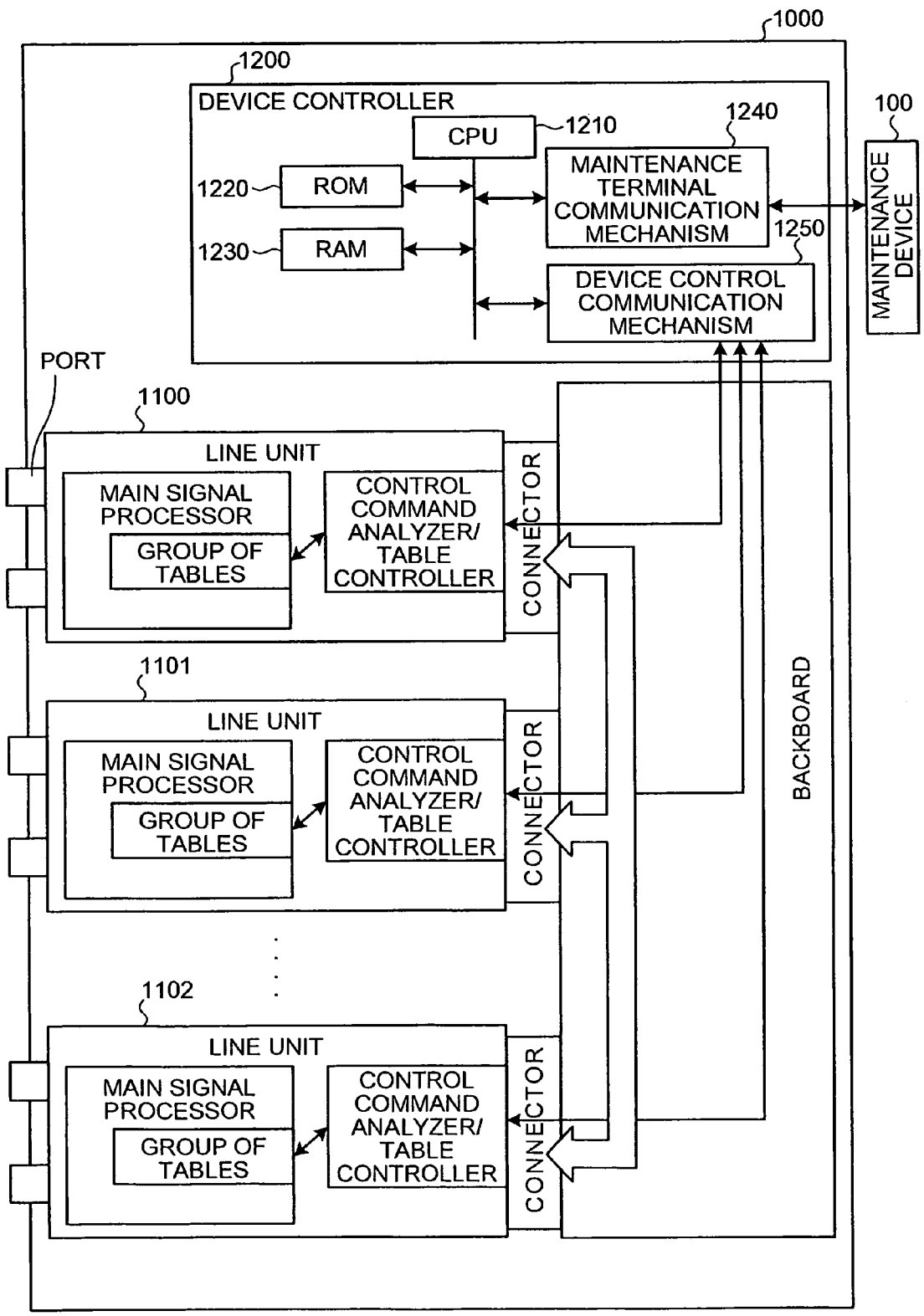
FIG. 4 is a block diagram of the chassis-type L2 switch.

FIG. 4 is a block diagram of the chassis-type L2 switch 1000. As already explained, the L2 switch 1000 includes a plurality of line units 1100 through 1102 that are interconnected via a bus connection with the backboard.

The L2 switch 1000 also includes a device controller 1200 that manages the overall operations of the L2 switch 1000. The device controller 1200 includes a central processing unit (CPU) 1210, a read-only memory (ROM) 1220, a random access memory (RAM) 1230, a maintenance terminal communication mechanism 1240, and a device control communication mechanism 1250, all of which are connected by a bus.

The CPU 1210 is a computing device that executes software for controlling the operations of the L2 switch 1000. The ROM 1220 is a non-volatile memory that stores control software, various setting data, etc. The RAM 1230 is a memory for processing the control software and other data. The maintenance terminal communication mechanism 1240 is a processor through which the device controller 1200 exchanges data with a maintenance terminal 100. The device control communication mechanism 1250 is an interface through which the control software controls the line units 1100 through 1102.

The control software residing in the ROM 1220 is loaded on to the CPU 1210 when the L2 switch 1000 is started up, and is processed by the RAM 1230 for execution. When a command is received from the maintenance terminal 100 via the maintenance terminal communication mechanism 1240, the control software controls the line units 1100 through 1102 by the device control communication mechanism 1250 based on the contents of the command.

Each line unit 1100 through 1102 includes a main signal processor and a control command analyzer/table controller. The main signal processor implements communications. The control command analyzer/table controller receives a command from the control software via the device control communication mechanism 1250 and changes the setting of the tables that control the operation of the main signal processor.

Figure 5:
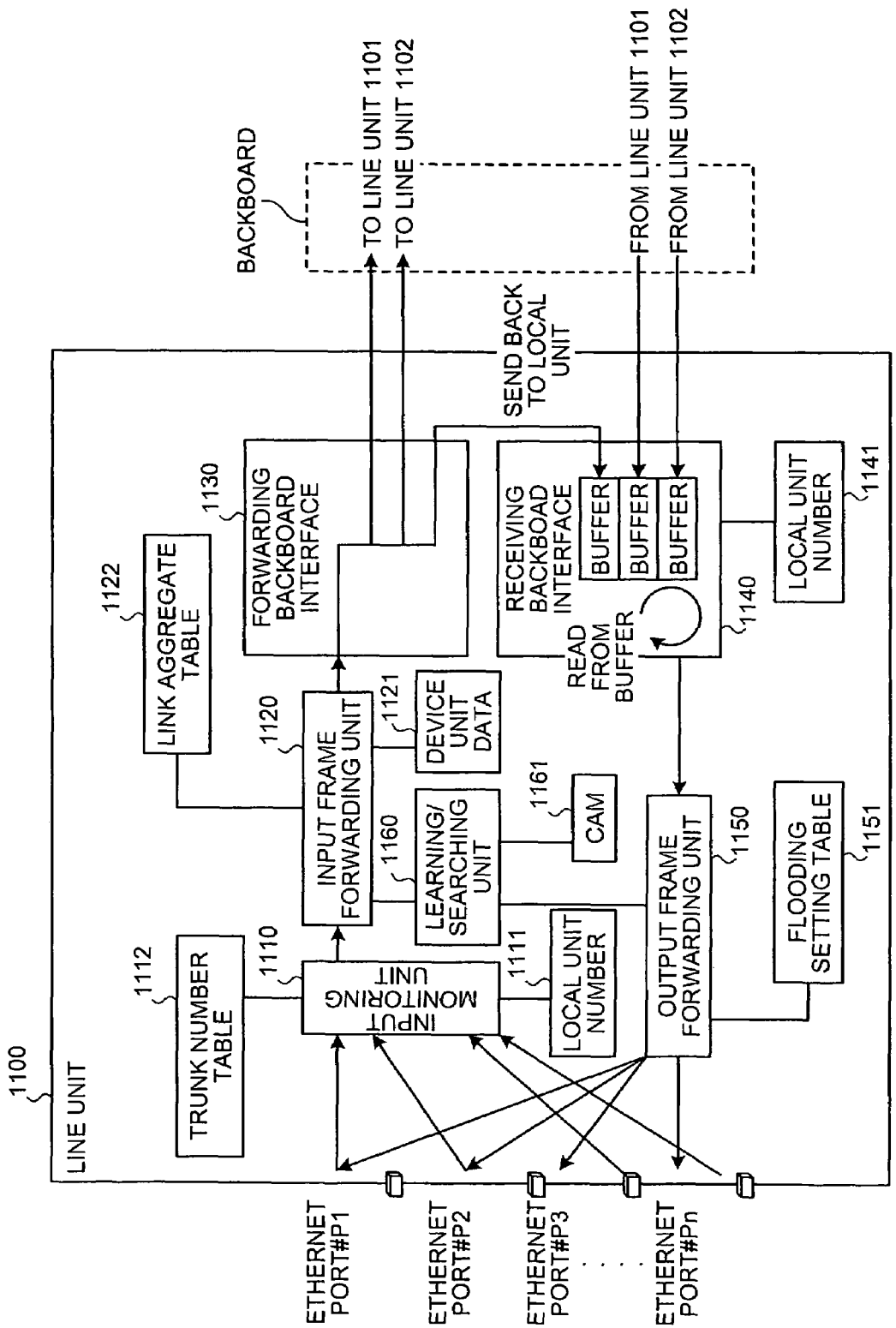
FIG. 5 is a block diagram of the line unit according to a first embodiment of the present invention.

The configuration of the main signal processor of the line unit of the L2 switch 1000 is explained next. FIG. 5 is a detailed block diagram of the line unit 1100. The line units 1101 and 1102 have similar configuration. In FIG. 5, the control command analyzer/table controller is not shown.

The line unit 1100 includes at least one Ethernet port, an input monitoring unit 1110, an input frame forwarding unit 1120, a forwarding backboard interface 1130, a receiving backboard interface 1140, an output frame forwarding unit 1150, and a learning/searching unit 1160.

The input monitoring unit 1110 monitors whether a MAC frame has been received at the Ethernet port, and if a normal MAC frame is received, tags an internal frame header to the MAC frame and forwards it to the input frame forwarding unit 1120.

FIG. 6 is an example of the format of the MAC frame. The MAC frame includes a destination MAC address, a source MAC address that represents source of the frame, a VLAN tag for identifying Virtual Local Area Network (VLAN), a payload that contains data relevant to the objective, and Frame Check Sequence (FCS) for detecting errors.

FIG. 7 is an example of the format of the internal frame header. The internal frame header consists of a destination unit bitmap, a destination port number, a receiving unit number, and a receiving port number.

The destination unit bitmap is the destination line unit represented in bits and is set as 1. The number of bits in the destination unit bitmap exceeds the number of line units the L2 switch 1000 can hold. The destination port number is the port in the line unit to which the frame is to be output. The receiving unit number and the receiving port number are the numbers of the receiving unit and the receiving port.

The input monitoring unit 1110 holds a trunk number table 1112, which it looks up upon receiving a normal frame and verifies whether a link aggregate is set in the port that receives the frame. If a link aggregate is set in the port, the input monitoring unit 1110 sets 0 in the receiving unit number of the internal frame header and the trunk number of the link aggregate in the receiving port number.

If no link aggregate is set in the port, the input monitoring unit 1110 sets the line unit's own local unit number 1100 in the receiving unit number of the internal frame header, and the port number of the port that receives the MAC frame in the receiving port number.

FIG. 8 is an example of the structure of the trunk number table 1112. The trunk number table 1112 contains a numerical value for each port. The port bearing the numerical value 0 represents a port in which link aggregate is not set. The port bearing a numerical value other than 0 is a port in which link aggregate is set.

In FIG. 8 is shown the trunk number table 1112 of the line unit 1100. The numerical value corresponding to the ports #P1 and #P2 is 0, indicating that no link aggregate is set in these ports. The numerical value corresponding to the port #P3 is 10, indicating that the link aggregate set in the port is the trunk number 10. Similarly, the numerical value corresponding to the port #P4 is 20, indicating that the link aggregate set in the port is the trunk number 20.

The input frame forwarding unit 1120 determines the forwarding destination of the MAC frame, reflects the result of the determination in the internal frame header, and sends the modified MAC frame to the forwarding backboard interface 1130.

The input frame forwarding unit 1120 retrieves the destination MAC address from the MAC frame and checks whether the retrieved destination MAC address is an address for multicasting or broadcasting. According to Ethernet standards, the MAC address with 1 in the last bit of the first byte is for multicasting or broadcasting.

If the retrieved destination MAC address is for multicasting or broadcasting, the input frame forwarding unit 1120 sets the destination unit bitmap such that all the line units of the L2 switch 1000 become destinations. Specifically, the input frame forwarding unit 1120 refers to its own device unit data 1121, and sets the bit corresponding to all the line units of the L2 switch 1000 to 1 in the destination unit bitmap. As no forwarding destination port is specified, 0 is set in the destination port number.

As a result, the MAC frame is output from all the ports of all the line units of the L2 switch 1000. The phenomenon of a MAC frame being output from all the ports of a line unit is called flooding.

If the retrieved destination MAC address indicates a specific forwarding destination, the input frame forwarding unit 1120 conveys the MAC address to the learning/searching unit 1160 and prompts it to search previously learned knowledge corresponding to the MAC address. Learned knowledge refers to information pertaining to the transferred frames and is specifically the source MAC addresses stored associated with the location information of the receiving port (a combination of unit number and port number, or trunk number).

Learned knowledge helps identify the output location the next time the frame is to be sent in the reverse direction and thus avoid flooding.

If learned knowledge is found, the input frame forwarding unit 1120 verifies whether the learned unit number is 0. If the learned unit number is not 0, the input frame forwarding unit 1120 sets the destination unit bitmap and the destination port according to the learned knowledge so that the MAC frame is output only from specified ports of specified line units. Specifically, the input frame forwarding unit sets 1 in the destination unit bitmap corresponding to the learned unit number, and the learned port number in the destination port number.

If the learned unit number is 0, it indicates that the learned port number is a trunk number. In this case, the input frame forwarding unit 1120 looks up its own link aggregate table 1122, retrieves information pertaining to the links belonging to the link aggregate corresponding to the trunk number, selects one of the links as the output destination, and sets information pertaining to the selected link in the destination unit bitmap and the destination port number.

FIG. 9 is a schematic for explaining the contents of the structure of the link aggregate table 1122. The link aggregate table 1122 contains trunk number, number of ports in the links belonging to the link aggregate corresponding to the trunk number, and a list of port data of the links.

FIG. 9 specifically shows the link aggregate table 1122 of the line unit 1100. The link aggregate indicated by the trunk number 10 has 2 ports, listed as 0103 and 0203. Similarly, the link aggregate indicated by the trunk number 20 has 2 ports, listed as 0104 and 0204.

The first two digits of the port data indicate the unit number and the last two digits indicate the port number. For example, the port data 0103 refers to the port #P3 of the line unit whose unit number is #1.

Based on this information, the input frame forwarding unit 1120 selects the output port and set the unit number and the port number of the selected port in the internal frame header. For example, if the learned port number is 10, the input frame forwarding unit 1120 selects either 0103 or 0203, and sets the port data in the destination unit bitmap and the destination port number.

The input frame forwarding unit selects the port based on the result of a hashing process carried out based on the MAC address and the number of ports. Hashing decentralizes the ports to which the frame is to be output, thus avoiding zeroing in on any one particular link from among the links combined to form the link aggregate.

The forwarding backboard interface 1130 is a bus connection interface with the backboard, and replicates the MAC frame forwarded by the input frame forwarding unit 1120 and forwards it to all the routes.

The receiving backboard interface 1140 is a bus connection interface with the backboard that receives, via the backboard, the MAC frame forwarded by other line units and the MAC frame sent back by the forwarding backboard interface 1130 to the same unit, and temporarily stores the received MAC frames in the buffer.

The receiving backboard interface 1140 then reads the MAC frames from the buffer, refers to the destination unit bitmap of the internal frame header to search for the bit value corresponding to the line unit's 1100 own local unit number 1141. If the bit value is 1, the receiving backboard interface 1140 forwards the MAC frames to the output frame forwarding unit 1150, and if the bit value is 0, destroys the MAC frame.

The output frame forwarding unit 1150 deletes the internal frame header of the forwarded MAC frame and outputs the frame without the internal frame header to the specified port. Specified port refers to all the ports if the destination port number of the internal frame header is 0, the port bearing the designated port number if the destination port number is not 0.

However, if the MAC frame is inbound, to avoid frame duplication and looping, the output frame forwarding unit 1150 does not output the frame to the unit's own port even if the destination port number of the internal frame header is 0.

The output frame forwarding unit 1150 determines whether a port is slotted to be flooded by looking up a flooding setting table 1151. FIG. 10 is a drawing of an example of the structure of the flooding setting table 1151. As shown in FIG. 10, the flooding setting table 1151 contains ports and a value against each port indicating whether the port is slotted to be flooded. If the value is 1, the concerned port is slotted to be flooded, and if the value is 0, the port is not slotted to be flooded.

FIG. 10 is the flooding setting table 1151 for the line unit 1100 shown in FIG. 3. As shown in FIG. 10, the value 1 is set against all the ports in the line unit 1100, indicating that the frame is to be output to all the ports during flooding.

FIG. 11 is a drawing of the flooding setting table 1151 for the line unit 1101. As shown in FIG. 10, the value 0 is set against ports #P3 and #P4, indicating that the frame is not output to these two ports during flooding.

The reason why the ports #P3 and #P4 of the line unit 1101 are exempt from flooding is because the flooding setting table 1151 is configured for each line unit in such a way that only one link out of all the links forming the link aggregate is selected for frame output, so that the frame is not redundantly output to the same physical link. Thus frame duplication during flooding can be prevented.

The output frame forwarding unit 1150 conveys the source MAC address of the forwarded MAC frame and receiving unit number and the receiving port number of the internal frame header that was tagged to the MAC frame to the learning/searching unit 1160 and prompts the learning/searching unit 1160 to learn them.

The learning/searching unit 1160 stores the source MAC address, the receiving unit number, and the receiving port number conveyed by the output frame forwarding unit 1150 in a correlated form as the learned knowledge in the form of a learning table in a Content Addressable Memory (CAM) 1161. Upon an enquiry from the input frame forwarding unit 1120, the learning/searching unit 1160 searches the CAM 1161 for the MAC address being enquired about, and if found, responds to the input frame forwarding unit 1120, by sending the receiving unit number and the receiving port number corresponding to the MAC address.

Thus, by providing a learning function, the possibility of flooding is minimized and the load on the L2 switch and the network in general due to flooding can be prevented.

FIG. 12 is a drawing of an example of the structure of the learning table. The learning table consists of the MAC address, the unit number, and the port number in a correlated form, and is stored in the CAM 1161.

A process sequence of the L2 switch 1000 is explained next. For explaining the process sequence, communication between the communications terminal 200 and the communications terminal 207 in the network shown in FIG. 3 is taken as an example. The MAC address of the communications terminal 200 is assumed to be 0A and that of the communications terminal 207 is assumed to be 0B.

Figure 13:
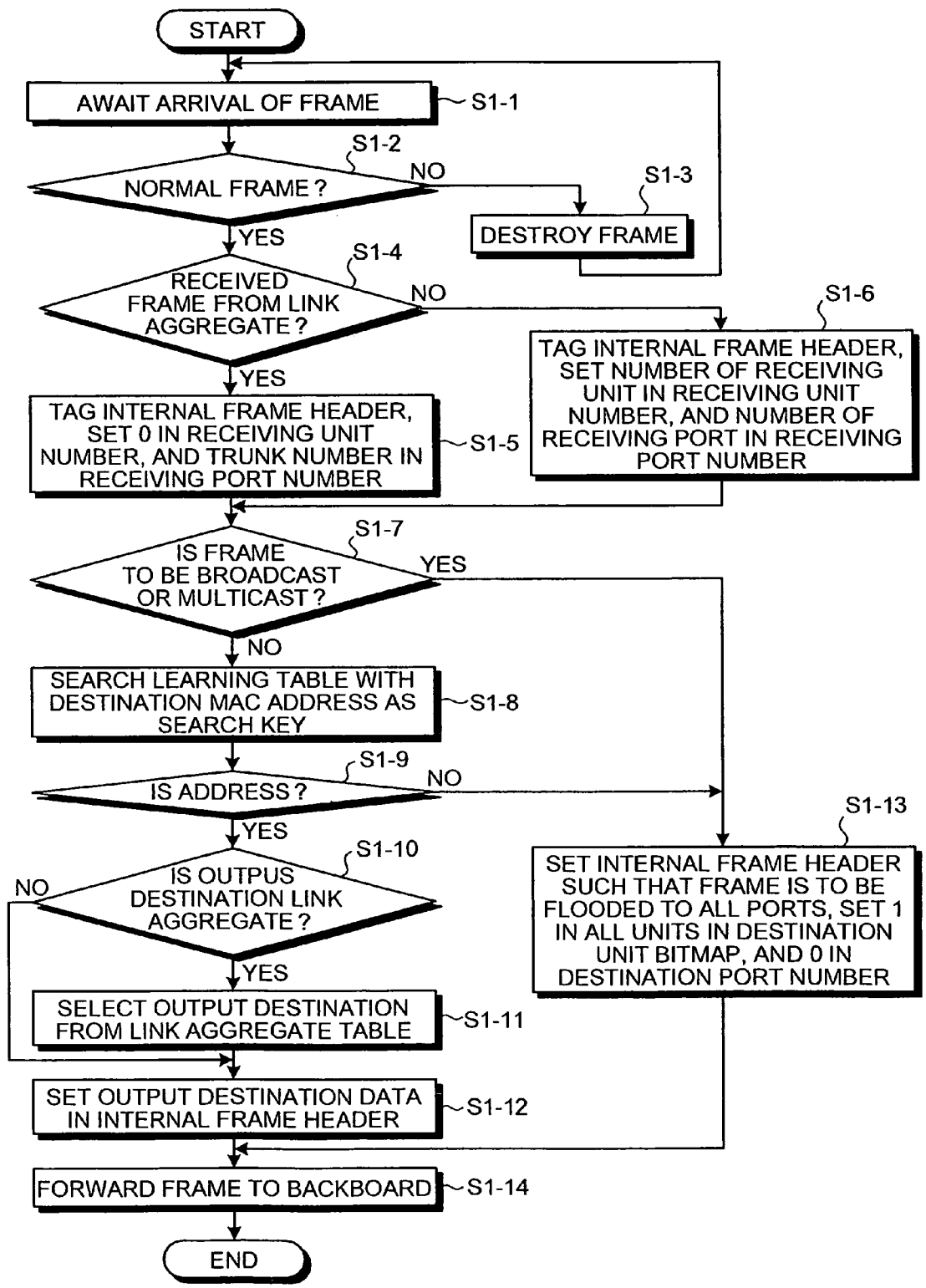
FIG. 13 is a flow chart of a process procedure for sending a frame received at an Ethernet port to a backboard.
Figure 14:
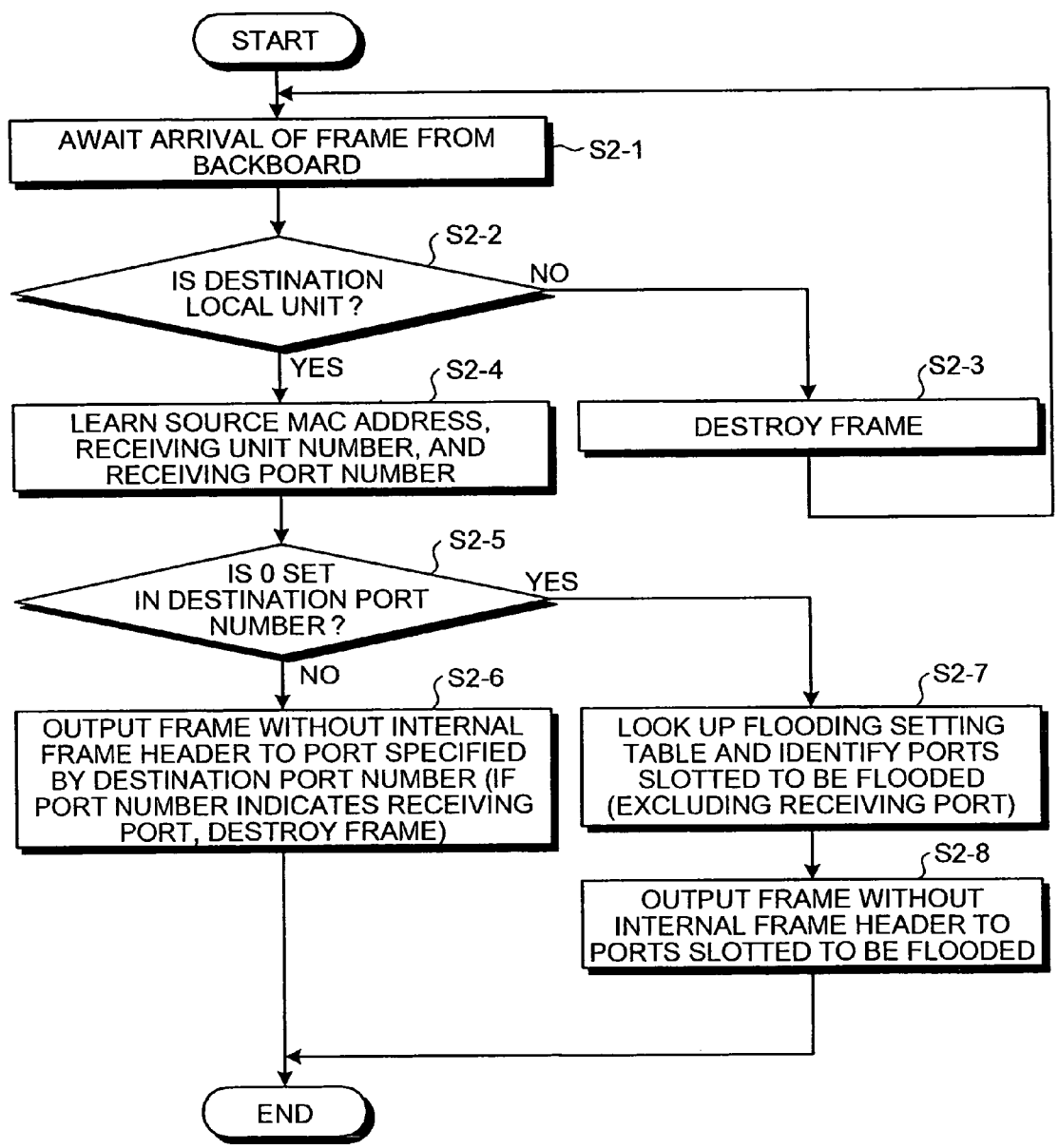
FIG. 14 is a flow chart of a process procedure for sending a frame received from the backboard to the Ethernet port.

FIG. 13 and FIG. 14 are flow charts of a process procedure for forwarding a MAC frame from the communications terminal 200 to the communications terminal 207 when the L2 switch 1000 has no previously learned knowledge of the routes.

FIG. 13 is a flow chart of a process procedure for sending a frame received at the Ethernet port to the forwarding backboard interface 1130.

The input monitoring unit 1110 of the line unit 1100 monitors all the Ethernet for arrival of the frame (step S1-1). In this example, the MAC frame forwarded by the communications terminal 200 is received by port #P1 of the line unit bearing the unit number #3.

Next, the input monitoring unit 1110 verifies whether the received MAC frame is normal (step S1-2). If the frame is found to be not normal according to Ethernet specifications ("No" at step S1-2), the input monitoring unit 1110 destroys the frame, and returns to monitoring the next frame (step S1-3).

If the frame is found to be normal ("Yes" at step S1-2), the input monitoring unit 1110 looks up the trunk number table 1112 to determine whether the port that received the frame belongs to a link aggregate (step S1-4). If the port belongs to a link aggregate ("Yes" at step S1-4), the input monitoring unit 1110 tags the internal frame header to the frame, sets 0 in the receiving unit number, and the trunk number obtained from the trunk number table 1112 in the receiving port number (step S1-5).

In this example, as port #P1 does not belong to a link aggregate ("No" at step S1-4), the input monitoring unit 1110 tags the internal frame header to the frame, and sets the unit number and the port number of the unit and port that received the frame respectively in the receiving unit number and receiving port number of the internal frame header (step S1-6). Specifically, the input monitoring unit 1110 set 3 in the receiving unit number and 1 in the receiving port number. The input monitoring unit 1110 then forwards the frame with the internal frame tag to the input frame forwarding unit 1120.

The input frame forwarding unit 1120 checks whether the destination MAC address of the frame indicates multicasting or broadcasting (step S1-7), and if so ("Yes" at step S1-7), sets 0 in the destination port number of the internal frame header and 1 in all the units in the destination unit bitmap, indicating that the frame is to be flooded to all ports (step S1-13). The input frame forwarding unit 1120 then forwards the frame to the forwarding backboard interface 1130, to be forwarded to the backboard (step S1-14).

In this example, since the destination MAC address is the MAC address of the communications terminal 207, the input frame forwarding unit 1120 determines that the frame is not for multicasting or broadcasting ("No" at step S1-7), and prompts the learning/searching unit 1160 to search the learning table (step S1-8).

As no previous learned knowledge is present, and no data matching the destination MAC address is found ("No" at step S1-9), the input frame forwarding unit 1120 executes steps S1-13 and S1-14, treating the destination MAC address as it would an address for multicasting or broadcasting.

FIG. 15 is a drawing of an example of the internal frame header of the frame forwarded to the backboard after the aforementioned process. As shown in FIG. 15, 1 is set as the bit of the destination unit bitmap corresponding to line units 1100, 1101, and 1102, and 0 is set in the destination port number. 3 is set in the receiving unit number and 1 is set in the receiving port number.

As a result of the aforementioned process, the MAC frame bearing the internal frame header is forwarded to all the line units, namely, the line units 1100, 1101, and 1102, of the L2 switch 1000.

The process sequence from the step in which each line unit receives the MAC frame from the backboard is explained next, citing the example of the line unit 1100.

FIG. 14 is a flow chart of a process procedure for sending a frame received from the backboard to the Ethernet port.

The receiving backboard interface 1140 monitors to check if frames from the various units are present in the buffer (step S2-1). If a frame is present in the buffer, the receiving backboard interface 1140 checks the destination unit bitmap to determine if the destination is local unit (step S2-2), and if not ("No" at step S2-2), destroys the frame (step S2-3).

In this example, the frame destination is the local unit ("Yes" at step S2-2), the receiving backboard interface 1140 forwards the frame to the output frame forwarding unit 1150, which conveys the source MAC address of the frame, the receiving unit number and the receiving port number of the internal frame header to the learning/searching unit 1160, prompting the learning/searching unit 1160 to learn them (step S2-4).

The output frame forwarding unit 1150 checks whether 0 is set in the destination port number of the internal frame header (step S2-5). As the destination port number is 0 in this example ("Yes" at step S2-5), the output frame forwarding unit 1150 looks up the flooding setting table 1151, identifies the ports slotted to be flooded (step S2-7), and outputs the frame without the internal frame header to the identified Ethernet ports (step S2-8).

The aforementioned process is similarly carried out for the line units 1101 and 1102 as well. As all the ports are slotted to be flooded in the line unit 1100, as shown in FIG. 10, the frame is output to all the ports. In the case of the line unit 1101, as only ports #P3 and #P4 are exempt from flooding, as shown in FIG. 11, frame is output to all ports except ports #P3 and #P4.

As a result, only one frame is forwarded to the L2 switch 1002 through the link aggregate bearing the trunk number 20, other frames reaching the L2 switch 1002 are directed to the communications terminal 207.

The MAC address of the communications terminal 200 is entered in the learning table in all the line units in the L2 switch 1000. FIG. 16 is a drawing of an example of the learning table after learning has occurred. As shown in FIG. 16, the source MAC address 0A of the source of the MAC frame, the unit number #3 of the receiving line unit, and the port number #P1 of the receiving port are stored in the learning table in a correlated form.

The process sequence of the L2 switch 1000 involving forwarding the frame in the reverse direction, that is, from the communications terminal 207 to the communications terminal 200, is explained next with reference to FIG. 13 and FIG. 14. In this instance, the learning table containing the destination MAC address is made use of.

The frame forwarded to the communications terminal 207 is received by the L2 switch 1002, and forwarded to the L2 switch 1000 through the link aggregate bearing the trunk number 20. The link aggregate bearing the trunk number 20 is composed of two links. However, which of the links will carry the frame depends on the method by which frames are distributed to the ports by the link aggregation function of the L2 switch 1002. It is supposed here the frame is output from port #P4 of the L2 switch 1002 and is received at port #P4 of the line unit 1100 (unit number #1) of the L2 switch 1000.

The process sequence involving the MAC frame being received at port #P3 of the line unit 1100 and forwarded to the backboard is identical up to step S1-8 of FIG. 13 and hence not explained again.

Figures 18, 19:
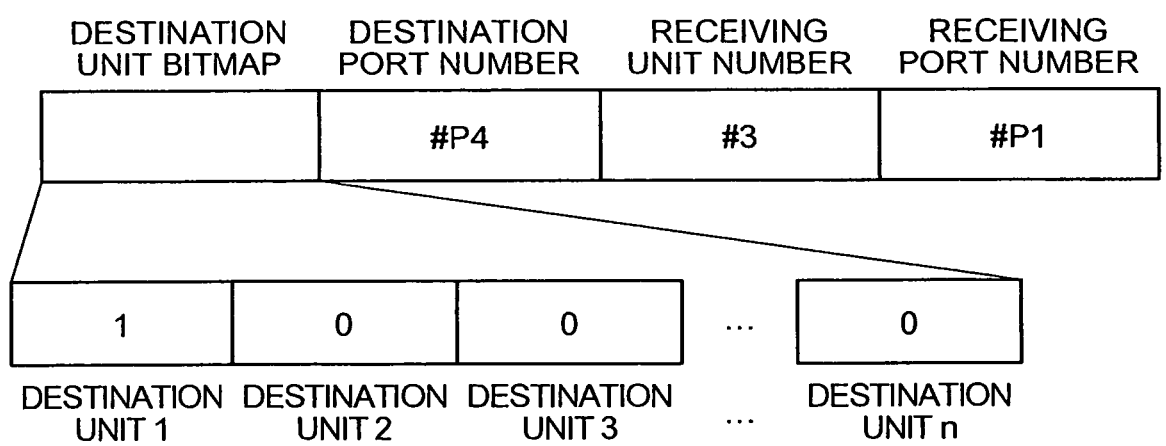
FIG. 18 is a schematic for explaining the contents of the learning table after learning has occurred.
FIG. 19 is a schematic for explaining the internal frame header of the frame forwarded to the backboard.

As the destination MAC address 0A is entered in the learning table, as shown in FIG. 18, as a result of search of the learning table carried out at step S1-8, the input frame forwarding unit 1120 determines that the MAC address is entered in the learning table ("Yes" at step S1-9), and gets the learned data pertaining to the unit and the port and determines whether the learned unit number is 0.

If the learned unit number is 0, that is, if the output destination belongs to a link aggregate ("Yes" at step S1-10), the input frame forwarding unit 1120 selects one of the port data set in the link aggregate table 1122 as the output destination (step S1-11). In this example, as the learned unit number is 3 ("No" at step S1-10), input frame forwarding unit 1120 treats the learned unit number and port number as the output destination.

The input frame forwarding unit 1120 then sets the data pertaining to the output destination in the destination unit number and the destination port number of the internal frame header (step S1-12), forwards the frame to the forwarding backboard interface 1130, to be forwarded to the backboard (step S1-14).

FIG. 17 is a drawing of an example of the internal frame header of the frame forwarded to the backboard after the aforementioned process. As shown in FIG. 17, in the destination unit bitmap, 1 is set only in the bit corresponding to the line unit 1102, and the destination port number is set as 1. Further, 0 is set in the receiving unit number and 20 in the receiving port number.

The frame bearing this internal frame header is forwarded to all the line units over the bus of the backboard. However, as 1 is set only in the bit corresponding to the line unit 1102, the frame is destroyed in all the line units apart from the line unit 1102.

The process sequence up to the step in which the frame received by the line unit 1102 from the backboard is output to the Ethernet port. This process sequence is identical up to step S2-4 of FIG. 14 and hence not explained again.

After prompting the learning/searching unit 1160 to learn the source MAC address of the frame, the receiving unit number and the receiving port number of the internal frame header at step S2-4, the output frame forwarding unit 1150 checks whether 0 is set in the destination port number of the internal frame header (step S2-5). As the destination port number in this example is 1 ("No" at step S2-5), the output frame forwarding unit 1150 outputs the frame without the internal frame header to the Ethernet specified by the destination port number (port #P1 in this example) (step S2-6).

As a result of the aforementioned process, the frame forwarded by the communications terminal 207 arrives at the communications terminal 200. The MAC address of the communications terminal 207 is entered in the learning table of the line unit 1102 of the L2 switch 1000. FIG. 18 is a drawing of an example of the learning table after learning has occurred. As shown in FIG. 18, the source MAC address 0B of the source of the MAC frame and the trunk number 20 are stored in the learning table in a correlated form. The trunk number is set in the port number field, and 0 is set in the unit number field.

The process sequence of MAC frame once again being forwarded from the communications terminal 200 to the communications terminal 207 is explained next with reference to FIG. 13 and FIG. 14. In this instance, the learning table containing the destination MAC address is made use of.

The frame forwarded from the communications terminal 200 is received at port #P1 of the line unit 1102 of the L2 switch 1000.

The process sequence involving the MAC frame being received at port #P1 of the line unit 1102 and forwarded to the backboard is identical up to step S1-8 of FIG. 13 and hence not explained again.

As the destination MAC address 0B is entered in the learning table, as shown in FIG. 18, as a result of search of the learning table carried out at step S1-8, the input frame forwarding unit 1120 determines that the MAC address is entered in the learning table ("Yes" at step S1-9), and gets the learned data pertaining to the unit and the port and determines whether the learned unit number is 0.

In this example, as the learned unit number is 0 indicating that the output destination belongs to a link aggregate ("Yes" at step S1-10), the input frame forwarding unit 1120 selects one of the port data set in the link aggregate table 1122 as the output destination (step S1-11).

Specifically, as the learned port number is 20, indicating that the output destination is a link aggregate, the input frame forwarding unit looks up the link aggregate table 1122 and gets the port data corresponding to the trunk number 20

The input frame forwarding unit 1120 then sets the data pertaining to the output destination in the destination unit number and the destination port number of the internal frame header (step S1-12), forwards the frame to the forwarding backboard interface 1130, to be forwarded to the backboard (step S1-14). Though two pieces of port data are listed corresponding to the trunk number 20 are 0104 and 0204, as shown in FIG. 9, the input frame forwarding unit 1120 selects only one of them by hashing process.

FIG. 19 is a drawing of an example of the internal frame header of the frame forwarded to the backboard after the aforementioned process. Assuming that the input frame forwarding unit 1120 selects 0104 as the output destination at step S1-11, in the destination unit bitmap shown in FIG. 19, 1 is set only in the bit corresponding to the line unit 1100, and the destination port number is set as 4. Further, 3 is set in the receiving unit number and 1 in the receiving port number.

Thus, when forwarding a frame to a trunk carrying link aggregate, the selection process of the output destination port varies in the case where the MAC address is not yet learned (that is, when flooding occurs) and in the case where the MAC address is learned. In other words, in the case where the MAC address is learned, the destination port is determined by the line unit receiving the frame, whereas in the case where flooding occurs, the destination port is determined based on the flooding setting table 1151 in the line unit that outputs the frame.

Even in the case where flooding occurs, the line unit receiving the frame may determine the destination port. However, it would require notifying the line unit, by the internal frame header, which ports are to be selected as destination ports. If the number of ports is significant, the internal frame header size will be unwieldy. Further, the processing at the receiving side will increase, delaying the forwarding process and a host of other problems. Hence, the method of determining the flooding destination ports by the receiving line unit is not adopted.

In the chassis-type L2 switch, some of the line units can be temporarily shut down for carrying out maintenance work, etc., and service can be continued using the remaining functional line units. Given the nature of the service as a communication carrier, it is of utmost importance to provide the user uninterrupted service. To that end, it is commonplace to provide link aggregates across the line units.

When carrying out maintenance work, command is sent to the L2 switch from an external maintenance device. Upon receiving the command, a control software in the L2 switch changes the settings of the different tables in each of the line units explained earlier according to the command.

A process sequence involving shutting down the line unit 1100 of the L2 switch 1000 of the network shown in FIG. 3 for maintenance check is explained next. As link aggregates across the line units 1100 and 1101 are formed by port #P3 and port #P4 of the line unit 1100 with the ports of the line unit 1101, communication can be continued uninterrupted with the L2 switches 1001 and 1002 even if the line unit 1100 is shut down.

Figure 20:
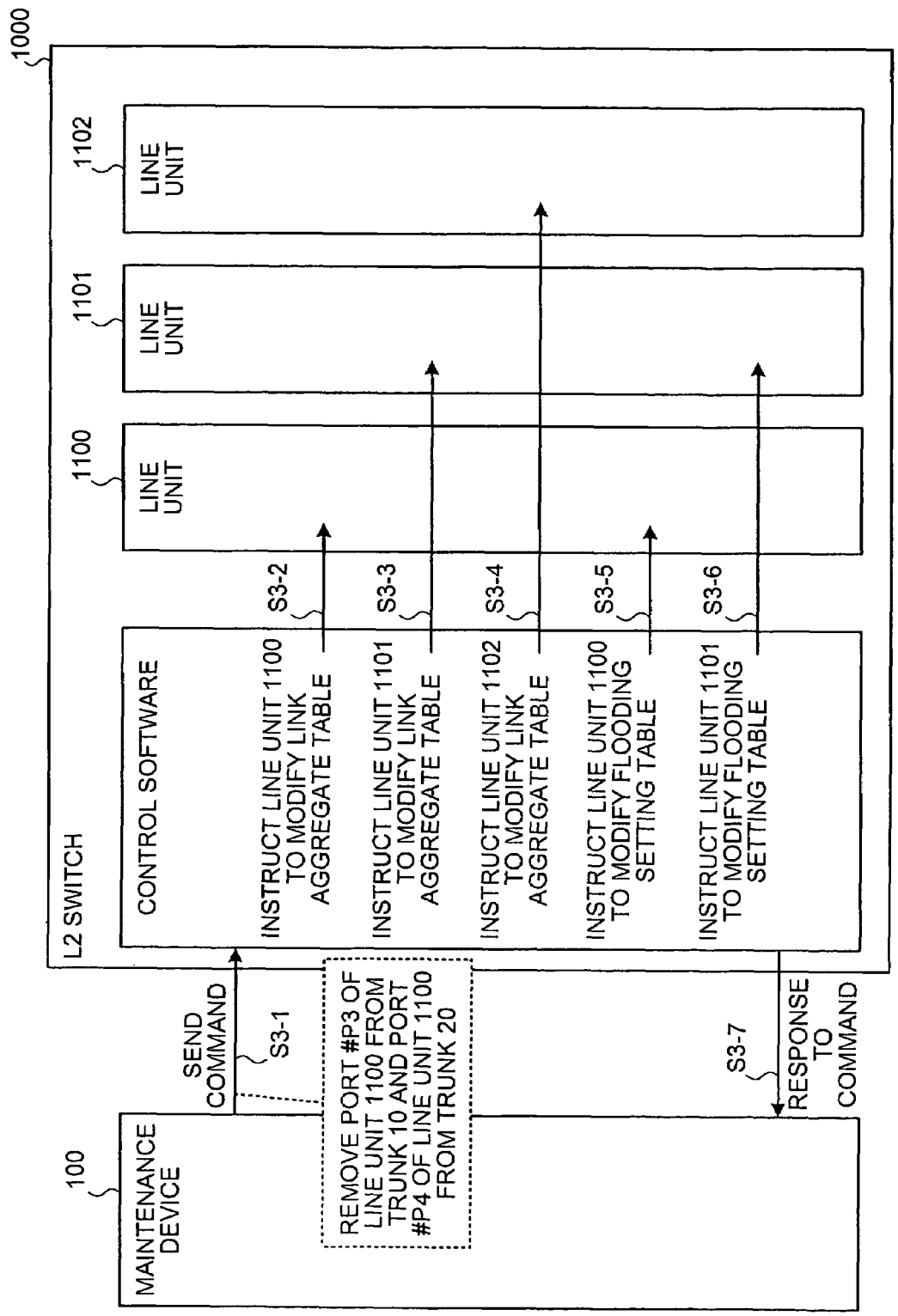
FIG. 20 is a schematic for explaining a process procedure for changing settings of link aggregate.

FIG. 20 is a drawing of the process sequence involving changing the link aggregate settings. As shown in FIG. 20, upon input by an administrator, a maintenance device 100 sends a command to the L2 switch 1000 instructing it to remove port #P3 from the line unit 1100 forming the trunk 10 and port #P4 from the line unit 1100 forming the trunk 20 (step S3-1).

Upon receiving the command, the control software of the device controller 1200 of the L2 switch 1000 instructs the line unit 1100 to delete the port data 0103 of trunk number 10, and the port data 0104 of trunk number 20 in its link aggregate table 1122 (step S3-2). The control software of the device controller 1200 similarly instructs the line units 1101 and 1102 (step S3-3 and step S3-4, respectively).

The control software of the device controller 1200 then instructs the line unit 1100 to modify its flooding setting table 1151 such that ports #P3 and #P4 are exempt from flooding (step S3-5) while instructing the line unit 1101 to modify its flooding setting table 1151 such that ports #P3 and #P4 are slotted to be flooded (step S3-6).

Upon completion of the above processes, the control software sends a response to the maintenance device 100 indicating that the instructions have been completed (step S3-7).

As a result, the port data of the line unit 1100 is deleted from the link aggregate table 1122 of each line unit, as shown in FIG. 21. Further, as shown in FIG. 22, the setting in the flooding setting table 1151 of the line unit 1100 is changed such that the flooding frame is not output from the line unit 1100 of the trunk 10 and the trunk 20, and, as shown in FIG. 23, the setting in the flooding setting table 1151 of the line unit 1101 is changed such that the flooding frame is output from the line unit 1101 of the trunk 10 and the trunk 20.

Thus, by modifying the link aggregate table 1122 and the flooding setting table 1151 of each line unit, the frame can be effectively prevented from being output from the line unit 1100 of the trunk 10 and the trunk 20, even as the trunks 10 an 20 remain connected to the L2 switches 1001 and 1002 via the ports of the line unit 1101.

However, in the process sequence described above, both port #P3 and #P4 are set to be flooded in the flooding setting table 1151 in the line unit 1100 as well as in the line unit 1101 between step S3-5 and step S3-6. As a result, in this period, there is a potential risk of the frame not being output from any of ports and being destroyed.

If the duration between the two steps can be shortened, the chances for frame destruction can be reduced. However, there are limitations when it comes to the performance of the communication unit and the software. Further, when the transfer rate of the frames is higher, even if the duration between the steps can be shortened, a good number of frames are likely to get destroyed as the number of frames that flow in that duration is significant.

On the other hand, if step S3-6 is executed before step S3-5, both ports #P3 and #P4 are set to be flooder simultaneously in both the line unit 1100 and the line unit 1101, resulting in frame duplication.

As destruction of frames leads to temporary stoppage of service, there is a need to have function for avoiding frame destruction, especially in a communication carrier device.

Figure 24:
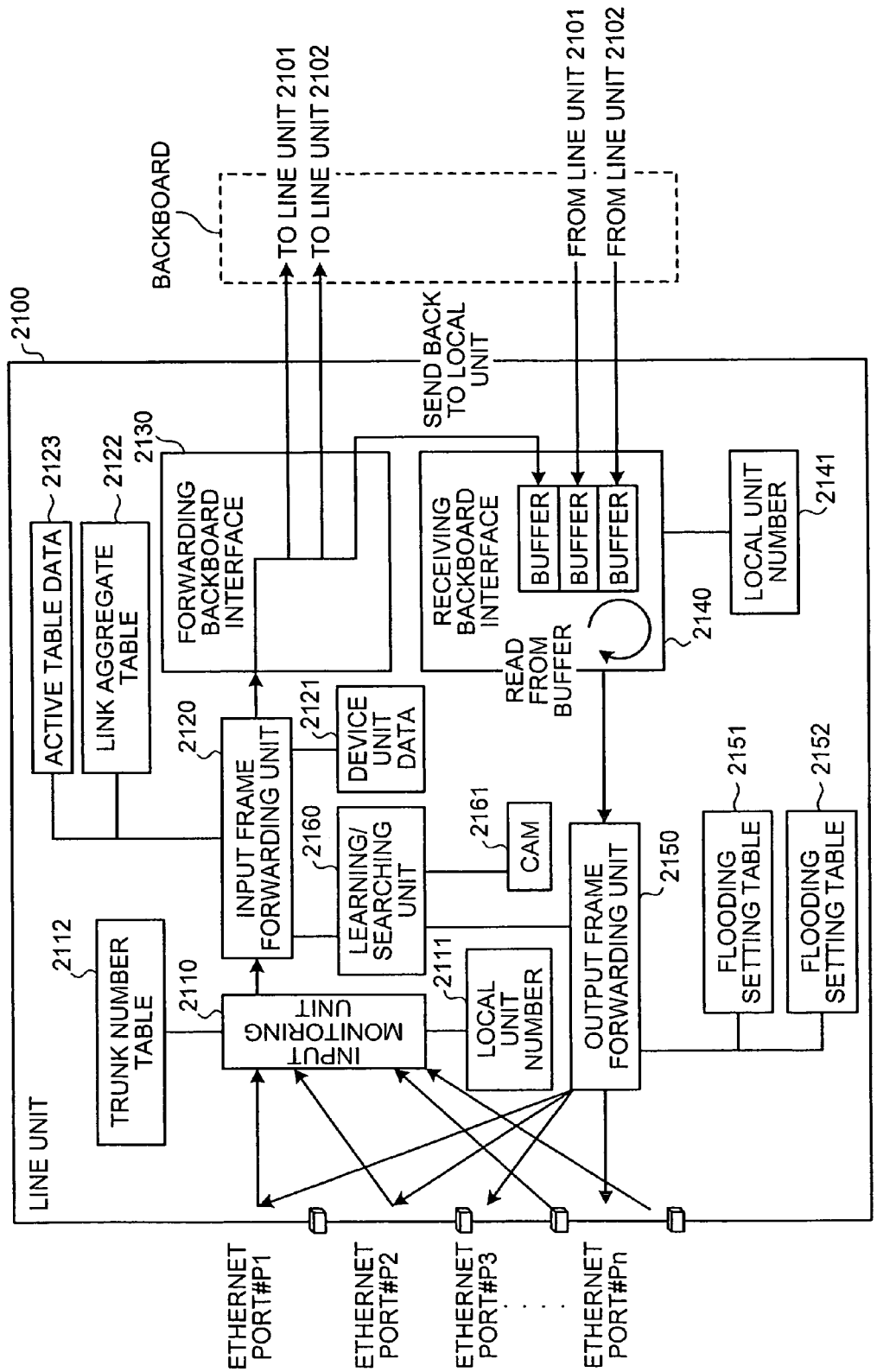
FIG. 24 is a block diagram of a line unit of an L2 switch according to a second embodiment of the present invention.

The L2 switch according to a second embodiment of the present invention is explained next. FIG. 24 is a block diagram of a line unit 2100 of the L2 switch according to the second embodiment.

The line unit 2100 has two flooding setting tables 2151 and 2152. When the status of one flooding setting table is active, the status of the other flooding setting table is made inactive. The control software determines which flooding setting table is to be made active.

The active flooding setting table is looked up by an output frame forwarding unit 2150 to determine which port is slotted for flooding, whereas the inactive flooding setting table is modified by the control software.

Thus, by manifolding the flooding setting table, and modifying the inactive flooding setting table in all the line units, and then once and for all switching the status of the active and the inactive flooding setting tables. In this way, the duration between step S3-5 and step S3-6 can be shortened.

However, frame destruction cannot be completely prevented by manifolding the flooding setting table alone. This is because, firstly, as the line units are physically independent, the switching of the status of the flooding setting tables in all the line units does not occur simultaneously even if the control software issues the instruction to all the line units simultaneously.

Secondly, as the frame separately forwarded to each line unit is buffered in a receiving backboard interface 2140, the timing of the frame reaching the output frame forwarding unit 2150 varies for each line unit. Consequently, for the same frame, while the output port is identified by looking up a non-modified flooding setting table for one line unit, the output port identified by looking up a modified flooding setting table for the remaining line units. As a result, frame destruction or duplication occurs.

Therefore, the line unit 2100 holds in its active table data 2123 a number that indicates which flooding setting table is to be made active. An input frame forwarding unit 2120 embeds the number in the internal frame header of the frame that is to be output. As the number is embedded before the frame is forwarded to each line unit via the backboard, the output destination for the same frame is determined by a common active flooding setting table. The value of the active table data 2123 is modified according to the instruction of the control software.

With such a configuration, frame destruction or duplication due to change in the link aggregate configuration can be prevented in the line unit 2100.

The value of the active table data is set in a field called active flooding setting table in the internal frame header. The output frame forwarding unit 2150 recognizes the flooding setting table 2151 as active if the value of the active table data 2123 is 1, and inactive if the value is 2.

Among the processing units of the line unit 2100, an input monitoring unit 2110, a forwarding backboard interface 2130, and the receiving backboard interface 2140 have identical functions as the input monitoring unit 1110, the forwarding backboard interface 1130, and the receiving backboard interface 1140, respectively, shown in FIG. 5.

The input frame forwarding unit 2120 differs from the input frame forwarding unit 1120 shown in FIG. 5 in that it embeds the active table data 2123 in the internal frame header to signal that the frame is marked for flooding.

FIG. 25 a drawing of an example of the format of the internal frame header according to the second embodiment.

As shown in FIG. 25, the internal frame header according to the second embodiment includes the field called active flooding setting table in which the input frame forwarding unit 2120 embeds a value.

The output frame forwarding unit 2150 differs from the output frame forwarding unit 1150 shown in FIG. 5 in that it looks up the active flooding setting table of the internal frame header and identifies the output ports based on the flooding setting table corresponding to the value embedded in the field active flooding setting table.

A process sequence of the L2 switch according to the second embodiment is explained next. The process sequence is explained by presenting an L2 switch 2000 which has a structure similar to the L2 switch 1000 shown in FIG. 3 except that the line units 1100, 1101, and 1102 are replaced by line units 2100, 2101, and 2102.

In the explanation that follows, the L2 switch 1000 shown in FIG. 3 is replaced by the L2 switch 2000. The line units 2101 and 2102 have a configuration similar to the line unit 2100.

Here too, the example of communication between the communications terminal 200 and the communications terminal 207 of the network shown in FIG. 3 is presented. The MAC address of the communications terminal 200 is 0A and that of the communications terminal 207 is 0B.

Figure 26:
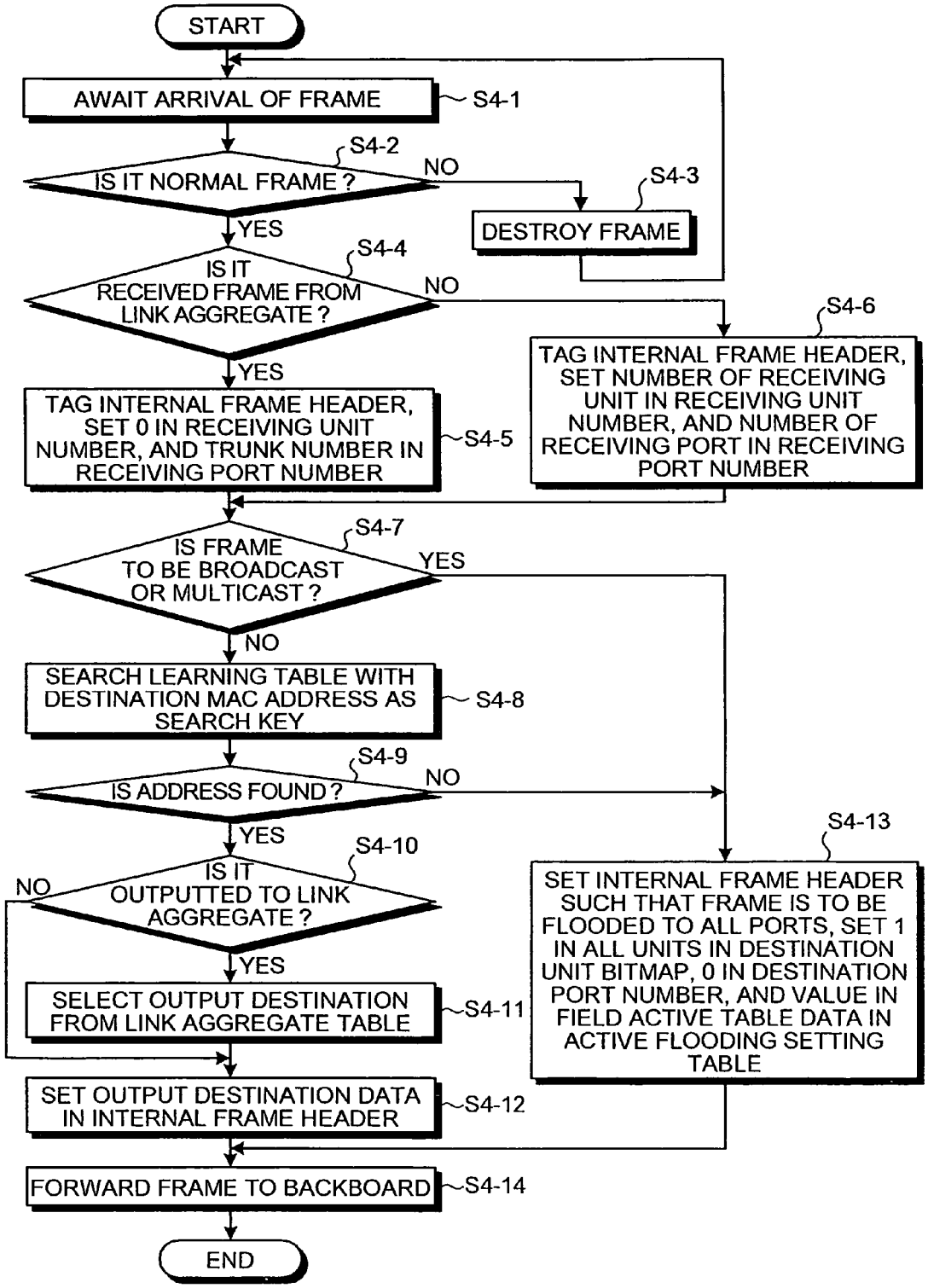
FIG. 26 is a flow chart of a process procedure for sending a frame received at the Ethernet port to a backboard.
Figure 27:
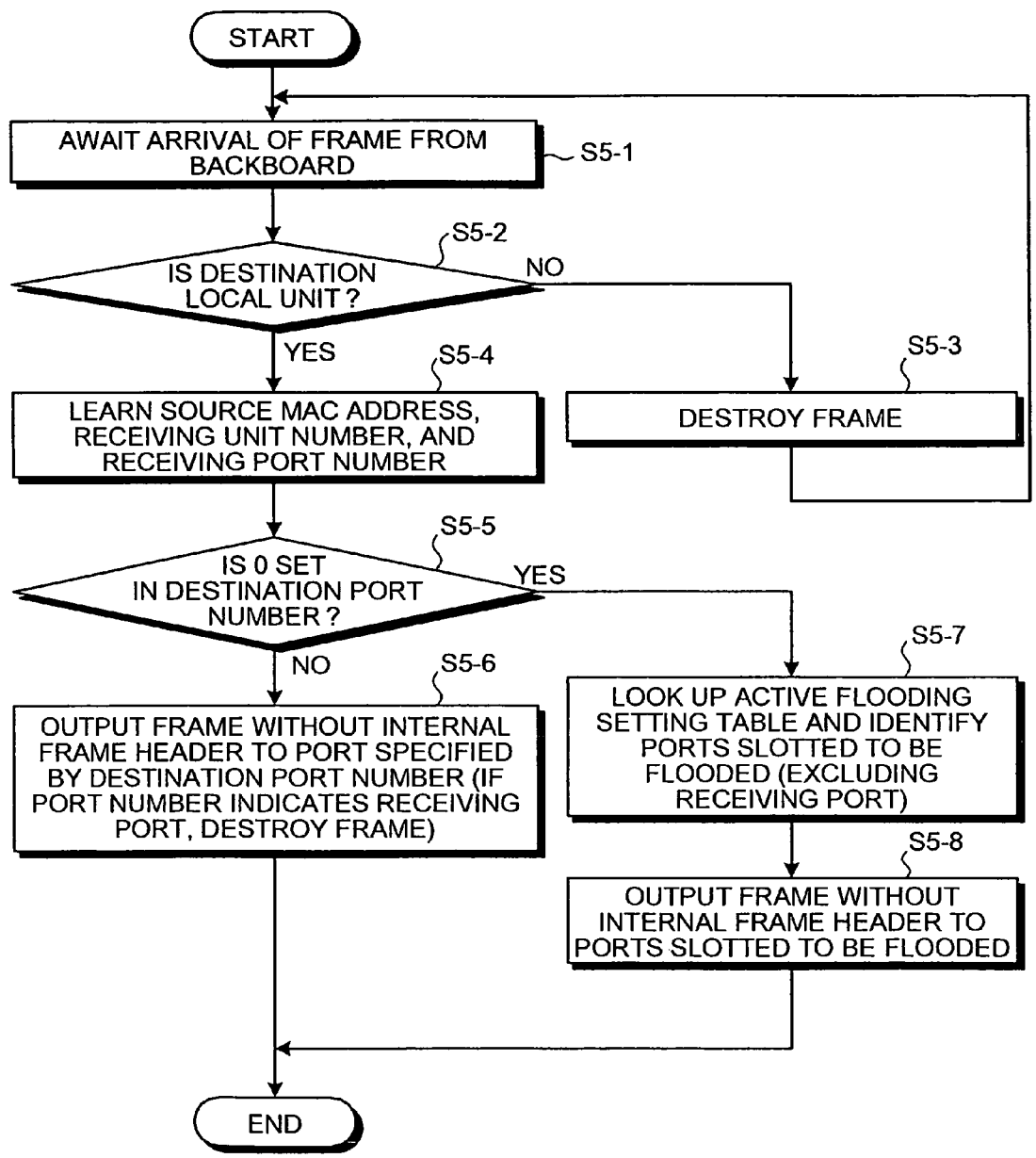
FIG. 27 is a flow chart of a process procedure for sending a frame received from the backboard to an Ethernet port.

FIG. 26 and FIG. 27 are flow charts of process procedures for forwarding a MAC frame from the communications terminal 200 to the communications terminal 207 when the L2 switch 2000 has no previously learned knowledge of the routes.

The MAC frame forwarded by the communications terminal 200 is received by a port #P1 of the line unit 2102 (unit number #3). Steps S4-1 to S4-8 are identical to steps S1-1 to S1-8 shown in FIG. 13 and hence are not described again.

In this example, as no previous learned knowledge is present, and no data matching the destination MAC address is found ("No" at step S4-9), the input frame forwarding unit 2120 sets 0 in the destination port number of the internal frame header and 1 in all the units in the destination unit bitmap, indicating that the frame is to be flooded to all ports. The input frame forwarding unit 2120 also sets a value in the field active table data 2123 of the active flooding setting table (step S4-13). The input frame forwarding unit 2120 then forwards the frame to the forwarding backboard interface 2130, to be forwarded to the backboard (step S4-14).

FIG. 28 is a drawing of an example of the internal frame header of the frame forwarded to the backboard after the aforementioned process. As shown in FIG. 28, 1 is set as the bit of the destination unit bitmap corresponding to line units 2100, 2101, and 2102, and 0 is set in the destination port number. 3 is set in the receiving unit number and 1 is set in the receiving port number. Further, 2 is set in the active flooding setting table. The value 2 is set in the active table data 2123 at that point in time.

As a result of the aforementioned process, the MAC frame bearing the internal frame header is forwarded to all the line units, namely, the line units 2100, 2101, and 2102, of the L2 switch 2000.

The process sequence from the step in which each line unit receives the MAC frame from the backboard is explained next, citing the example of the line unit 2100.

FIG. 27 is a flow chart of a process procedure for sending a frame received from the backboard to the Ethernet port.

Steps S5-1 to S5-4 are identical to steps S2-1 to S2-4 shown in FIG. 14, and hence are not described again.

As the destination port number is 0 in this example ("Yes" at step S5-5), the output frame forwarding unit 2150 looks up the flooding setting table and identifies the ports slotted to be flooded (step S5-7). The output frame forwarding unit 2150 determines which of the flooding setting tables 2151 and 2152 to look up based on the value set in the active flooding setting table of the internal frame header. As the value in the example shown in FIG. 28 is 2, the output frame forwarding unit 2150 looks up the flooding setting table 2152.

The output frame forwarding unit 2150 then outputs the frame without the internal frame header to the identified Ethernet ports (step S5-8).

The aforementioned process is similarly carried out for the line units 2101 and 2102 as well. As the output frame forwarding unit 2150 of all the line unit 2100, 2101, and 2102 determines the active flooding setting table based on the data set in the internal frame header by the input frame forwarding unit 2120 of the line unit 2102, no discrepancy regarding the flooding setting table occurs. As a result, frame destruction or duplication occurring due to such discrepancies is prevented.

The process sequence in the L2 switch 2000 involving communication between the communications terminal 200 and the communications terminal 207 after the MAC address is entered in the learning table is identical to the process sequence explained for the L2 switch 1000.

A process sequence involving shutting down the line unit 2100 of the L2 switch 2000 of the network shown in FIG. 3 for maintenance check is explained next. As link aggregates across the line units 2100 and 2101 are formed by port #P3 and port #P4 of the line unit 2100 with the ports of the line unit 2101, communication can be continued uninterrupted with the L2 switches 2001 and 2002 even if the line unit 2100 is shut down.

Figure 29:
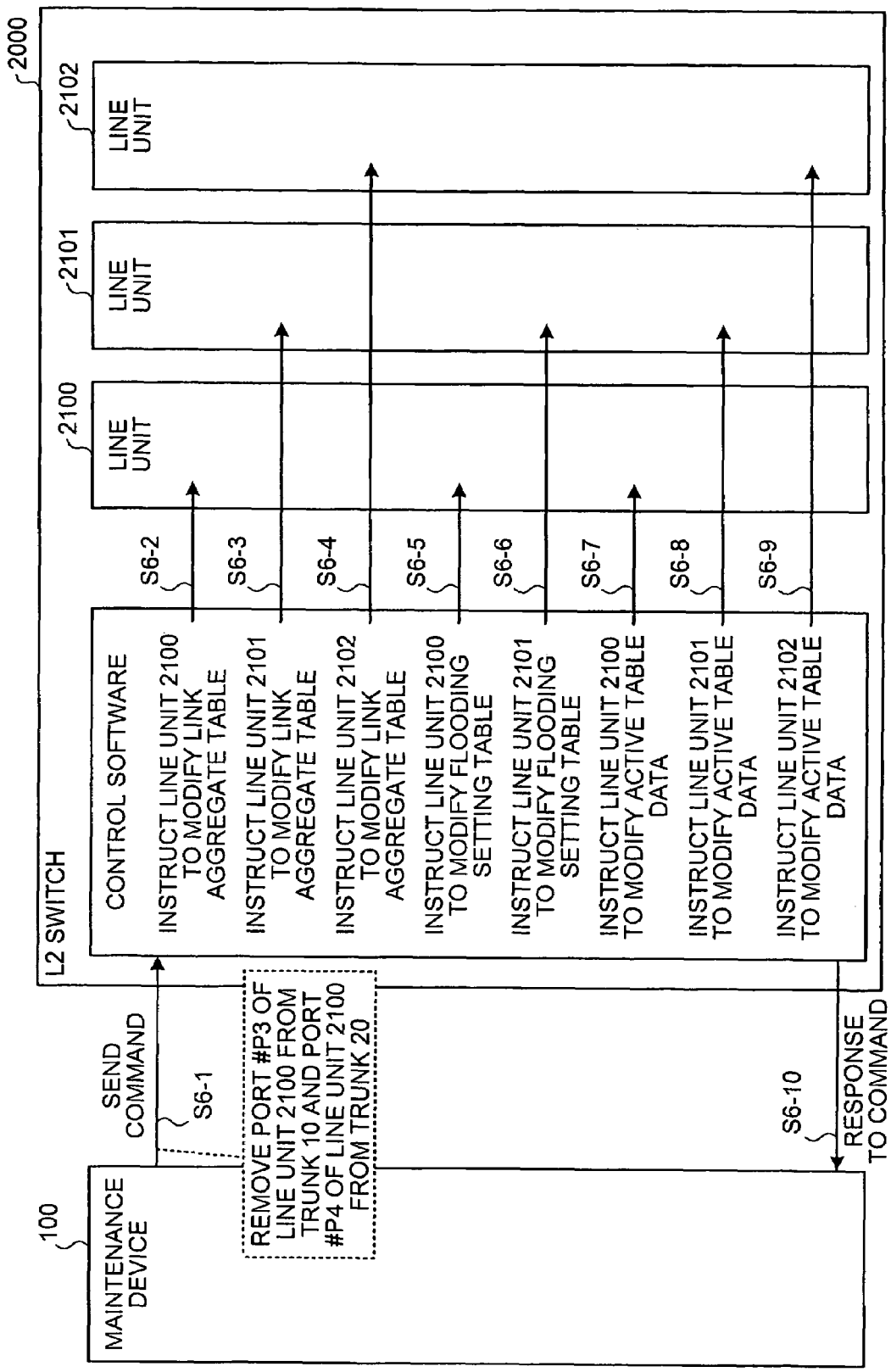
FIG. 29 is a schematic for explaining a process procedure for changing settings of link aggregate.

FIG. 29 is a drawing of the process sequence involving changing the link aggregate settings. As shown in FIG. 29, upon input by the administrator, the maintenance device 100 sends a command to the L2 switch 2000 instructing it to remove port #P3 from the line unit 2100 forming the trunk 10, and port #P4 from the line unit 2100 forming the trunk 20 (step S6-1).

Upon receiving the command, the control software of a device controller 2200 of the L2 switch 2000 instructs the line unit 2100 to delete the port data 0103 of trunk number 10, and the port data 0104 of trunk number 20 in its link aggregate table 2122 (step S6-2). The control software of the device controller 2200 similarly instructs the line units 2101 and 2102 (step S6-3 and step S6-4).

The control software of the device controller 2200 then instructs the line unit 2100 to modify its inactive flooding setting table such that ports #P3 and #P4 are exempt from flooding (step S6-5) while instructing the line unit 2101 to modify its inactive flooding setting table such that ports #P3 and #P4 are slotted to be flooded (step S6-6).

As a result, the flooding setting table of the line unit 2100 looks like the flooding setting table shown in FIG. 30 and the flooding setting table of the line unit 2101 looks like the flooding setting table shown in FIG. 31. In this example, the flood setting table 2151 is the active flooding setting table. Therefore, this modification of the inactive flooding setting table does not affect the actual flooding process.

Next, the control software of the device controller 2200 then instructs the line unit 2100 to modify the active table data 2123 such that the inactive flooding setting table becomes active (step S6-7). The control software similarly instructs the line units 2101 and 2102 to modify the active table data 2123 (step S6-8 and step S6-9, respectively). Thus, by switching the status of the flooding setting table from inactive to active, the frame can be prevented from being output from ports #P3 and #P4.

Upon completion of the above processes, the control software sends a response to the maintenance device 100 indicating that the instructions have been completed (step S6-10). Thus, the line unit 2100 is removed from the link aggregate without causing frame destruction or duplication.

In the process explained here, a single command from the maintenance device 100 is executed on both the trunks 10 and 20 at a time. However, a single command from the maintenance device 100 may be aimed at one trunk at a time. The process in this instance involves changing all the tables and then switching the operational status of the flooding setting table of the trunk 10 followed by doing likewise for the trunk 20.

Thus, according to the present invention, the line unit 2100 holds in its active table data 2123 a number that indicates which flooding setting table is to be made active. The input frame forwarding unit embeds the number in the internal frame header of the frame that is to be output. As the number is embedded before the frame is forwarded to each line unit via the backboard, the output destination for the same frame is determined by a common active flooding setting table. As no discrepancy regarding the flooding setting table occurs, frame destruction or duplication occurring due to such discrepancies is prevented.

According to the present invention, setting data pertaining to frame transmission is stored in a plurality of forms. Which setting data will be applied is determined based on an identification data embedded in the frame being transmitted. Consequently, even if a plurality of communication control units are requested to transmit the same frame, transmission is carried out based on the same setting data irrespective of the difference in the timing in the transfer process carried out by the different communication control units.

According to the present invention, the transmission apparatus consists of a plurality of communication units that are mutually connected. Therefore, when transmitting the frame, the identification data is embedded in the frame in the forwarding communication unit and the receiving communication unit selects the setting data for transmitting the frame based on the identification data embedded in the frame. Consequently, even if a plurality of communication control units are requested to transmit the same frame, transmission is carried out based on the same setting data irrespective of the difference in the timing in the transfer process carried out by the different communication control units.

According to the present invention, the identification data that is embedded in the frame is already available in the communication unit. Consequently, the setting data required for frame transmission can be made common communication unit by communication unit.

According to the present invention, link aggregates can be set in the transmission apparatus and when the frame is to be transmitted by such a transmission apparatus, the identification data is embedded in the frame by the forwarding communication unit, while the receiving communication unit selects the setting data required for flooding based on the identification data embedded in the frame. Consequently, even if the forwarding communication unit requests a plurality of communication control units to transmit the same frame, transmission is carried out based on the same setting data irrespective of the difference in the timing in the transfer process carried out by the different communication control units.

As a result, if the setting data for flooding is updated for changing the configuration of the link aggregate, the receiving communication units output the same frame based on a common setting data. Consequently, frame destruction or duplication caused by discrepancy in the setting data can be avoided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission apparatus that forwards received frames, comprising:

at least one receiving communication unit configured to receive the frame and at least one forwarding communication unit configured to forward the frame, the receiving communication unit and the forwarding communication unit being connected to each other, wherein the receiving communication unit includes an embedding unit that embeds in a received frame identification data indicative of information required for selecting a setting table among a plurality of setting tables; and a communication control unit that forwards identification data embedded frame to the forwarding communication unit, and the forwarding communication unit includes a storage unit that stores the setting tables pertaining to frame transmission;

a selecting unit that selects a setting table among the setting tables stored in the storage unit based on the identification data embedded in the identification data embedded frame; and a communication control unit that forwards the frame according to the setting table selected by the selecting unit, wherein the transmission apparatus is capable of forming link aggregates, a link aggregate being a logical link formed by combining a plurality of physical links, wherein in the forwarding communication unit the storage unit stores, in the respective setting tables, data pertaining to ports in the forwarding communication unit to which the frame is to be output during flooding, and the communication control unit determines ports to which the frame is to be output based on the setting table selected by the selecting unit during flooding.

2. The transmission apparatus according to claim 1, wherein the receiving communication unit includes a storing unit that stores therein identification data to be embedded in the frame.

3. A transmission method for forwarding received frames, the transmission method being realized on a transmission apparatus, the transmission apparatus including at least one receiving communication unit configured to receive the frame and at least one forwarding communication unit configured to forward the frame, the receiving communication unit and the forwarding communication unit being connected to each other, the transmission method comprising:

the receiving communication unit performing embedding in a received frame identification data indicative of information required for selecting a setting table among a plurality of setting tables; and forwarding identification data embedded frame to the forwarding communication unit, and the forwarding communication unit performing storing in a storage unit the setting tables pertaining to frame transmission;

selecting a setting table among the setting tables stored in the storage unit based on the identification data embedded in the identification data embedded frame; and forwarding the frame according to the setting table selected at the selecting, wherein the transmission apparatus is capable of forming link aggregates, a link aggregate being a logical link formed by combining a plurality of physical links, wherein in the forwarding communication unit the storing includes storing, in the respective setting tables, data pertaining to ports in the forwarding communication unit to which the frame is to be output during flooding, and forwarding includes determining ports to which the frame is to be output based on the setting table selected at the selecting during flooding.

4. The transmission method according to claim 3, wherein the receiving communication unit storing in a storage unit identification data to be embedded in the frame.

* * * * *